Oct. 10, 1961     D. HEYER     3,003,318
FLUID COUPLED TRANSMISSION MECHANISM
Filed March 18, 1957     4 Sheets-Sheet 1

DON HEYER
INVENTOR.

BY Paul A. Weilein
ATTORNEY.

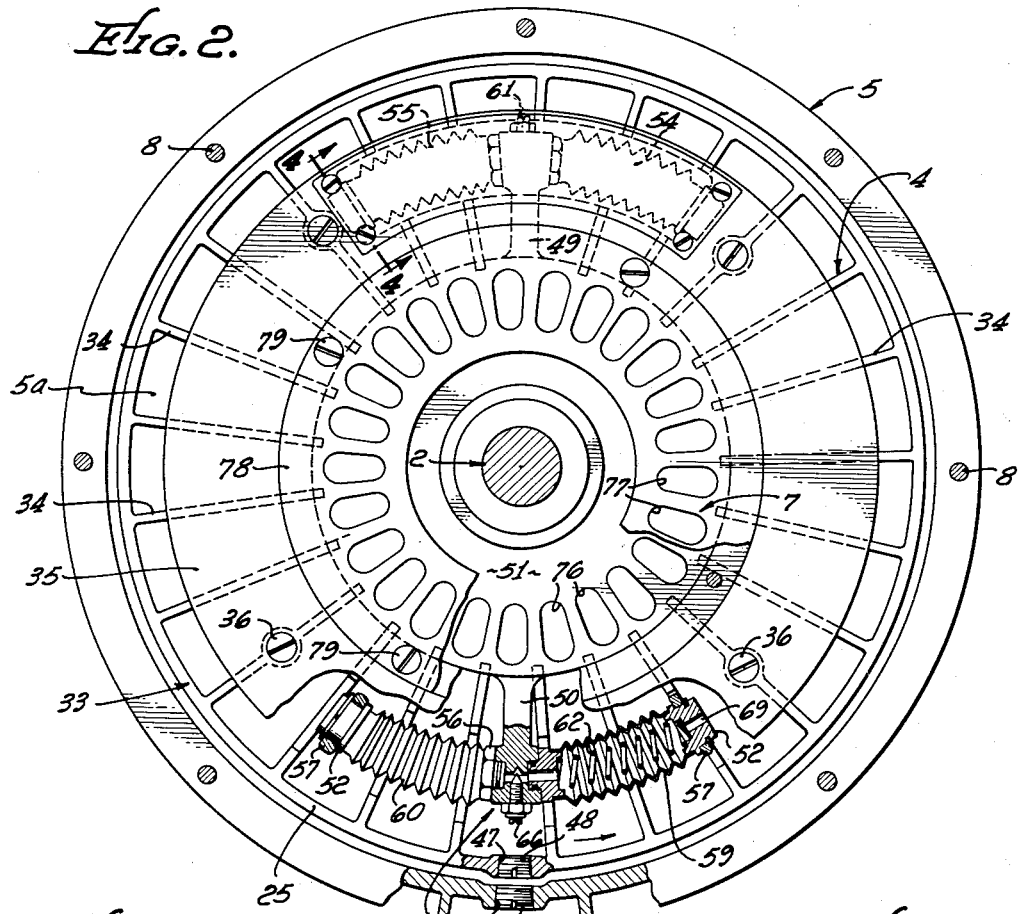
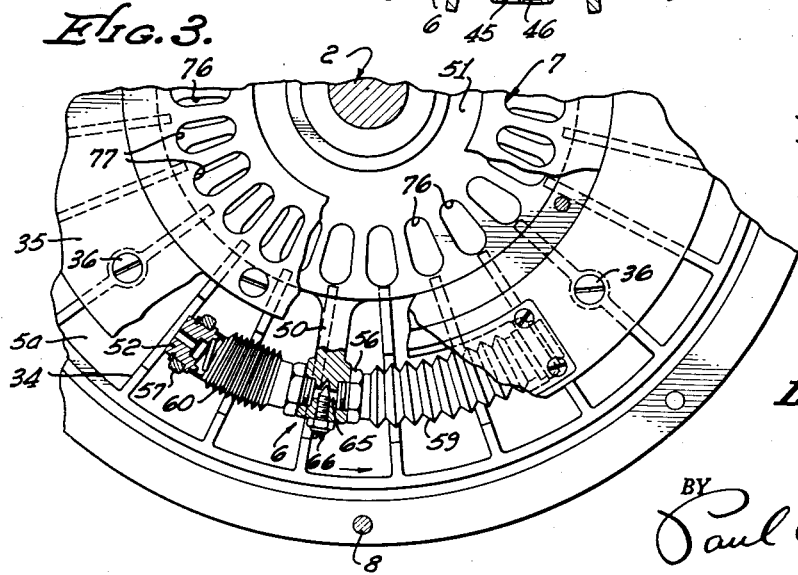
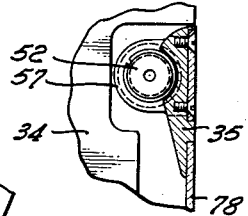
Don Heyer
INVENTOR.

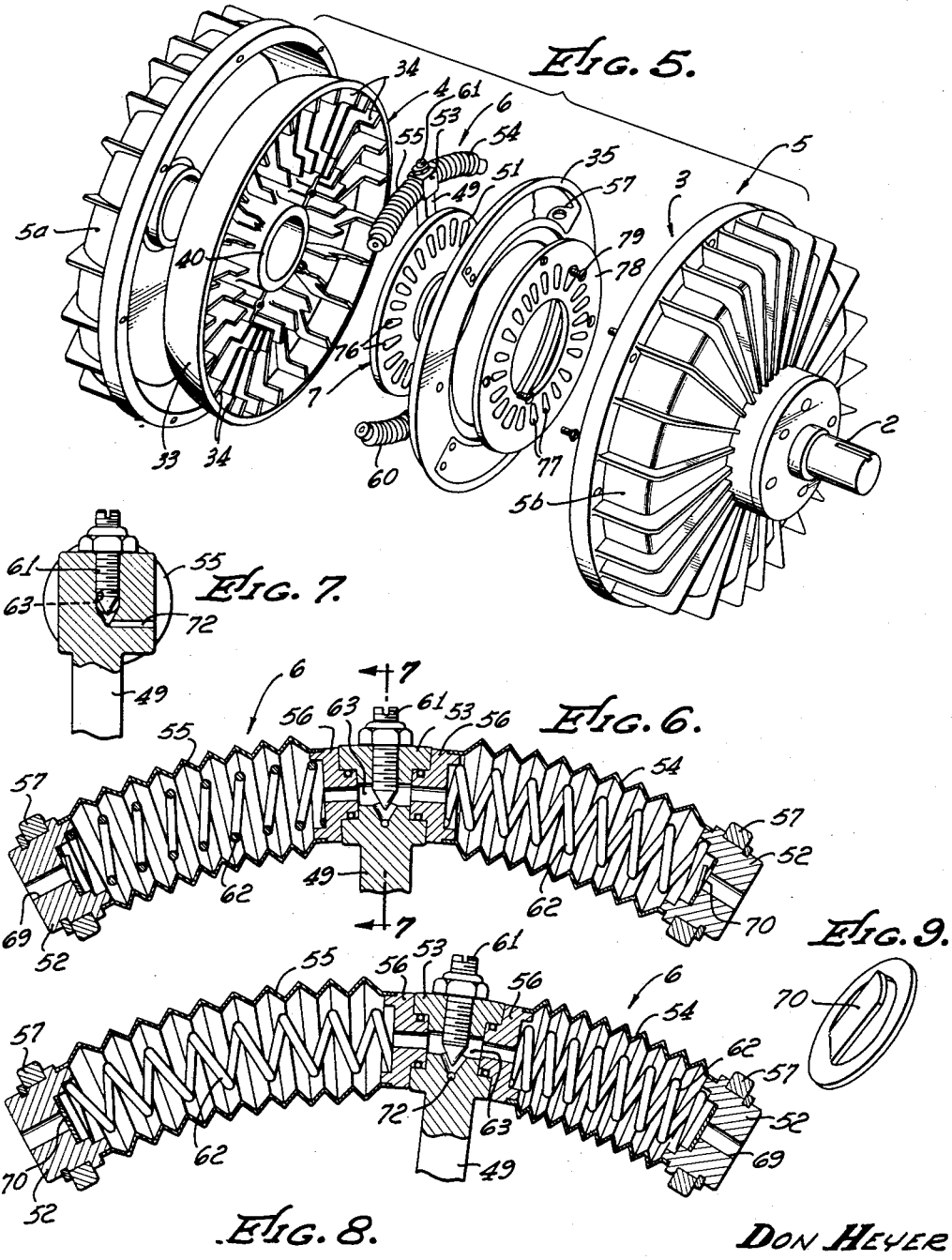

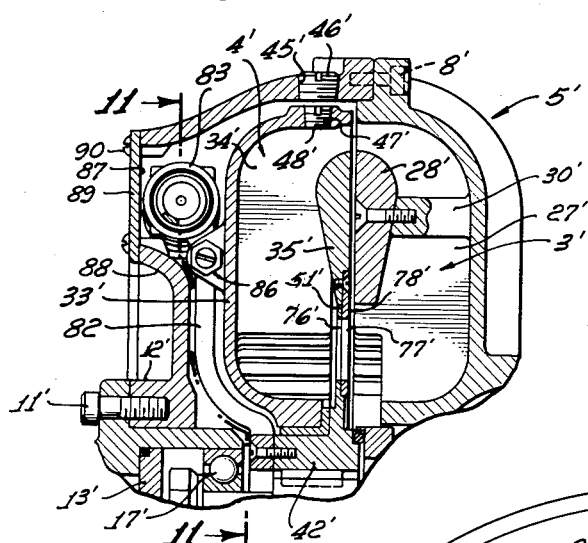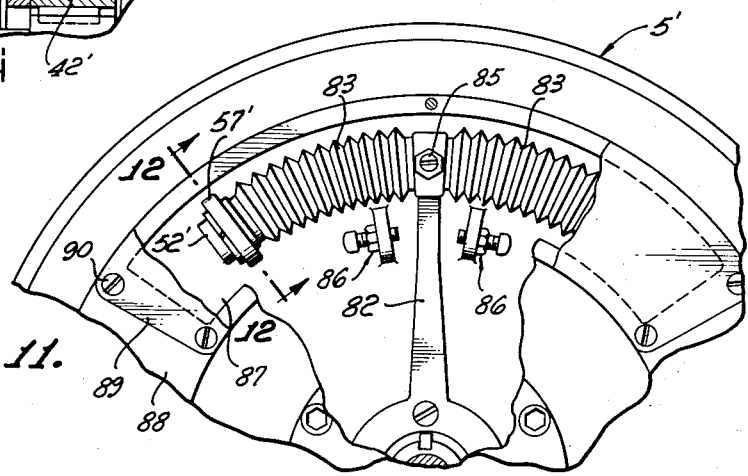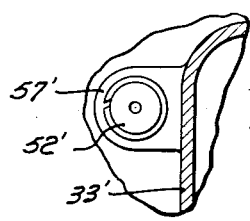

United States Patent Office 3,003,318
Patented Oct. 10, 1961

3,003,318
FLUID COUPLED TRANSMISSION MECHANISM
Don Heyer, 4169 Cogswell Road, El Monte, Calif.
Filed Mar. 18, 1957, Ser. No. 646,852
15 Claims. (Cl. 60—54)

This invention relates to power transmission mechanism of the fluid impeller type wherein a driving rotor or impeller is driven by a suitable power source to effect a fluid driving couple with a driven rotor for operating a driven or power take-off shaft.

It is an object of the present invention to provide in transmission mechanism of the character described, novel means for automatically controlling the driving force of the fluid in accordance with the torque requirements of the driven or power take-off shaft.

It is another object of this invention to provide in transmission mechanism such as next above noted, means which may be manually set to vary the action of the automatic fluid control means best to provide efficient starting and running characteristics suitable for a wide variety of power transmission applications.

It is another object of this invention to provide an automatic fluid coupled transmission mechanism wherein a fluid driven rotor is drivingly coupled to a driven shaft by novel flexible drive means which permits of limited relative movement between the driven rotor and the driven shaft and operates control means to vary the driving force of the fluid according to the relative movement of the driven rotor and the driven shaft as caused by the torque requirements of the driven shaft.

Another object of this invention is the provision in transmission mechanism of the character described of novel and efficient means which automatically delays and transmits the effective driving force of the fluid for driving the driven rotor according to varying loads imposed on the driven shaft, in a manner assuring the desired starting and running characteristics of the mechanism.

It is a further object of this invention to provide a fluid coupled transmission mechanism such as described where novel control means operates responsive to the torque requirements of the driven shaft to restrain and control the driving force of the fluid so as to allow the impeller to freely accelerate to maximum torque. These provisions make it possible to operate the mechanism with a smaller power source and to employ simply constructed compact rotor devices and associated parts, inasmuch as the load of the driven shaft will be engaged smoothly and in proportion to the torque requirements as a result of the action of the aforesaid time delaying control means.

It is another object of this invention to provide fluid coupled transmission of the character described wherein the two rotor units are constructed and arranged so that either may be operated as the driving unit or the driven unit without sacrificing any of the objects or advantages of the invention.

This invention possesses many other advantages and has other objects which may be made more easily apparent from a consideration of the embodiments of the invention shown in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIG. 2 is a sectional view taken on the line 2—2 of FIG. 1 with parts broken away and other parts shown in section for clarity of illustration;

FIG. 3 is a fragmentary sectional view corresponding to the lower portion of FIG. 2 showing parts of the mechanism in a different position than in FIG. 2;

FIG. 4 is a fragmentary sectional view taken on the line 4—4 of FIG. 2;

FIG. 5 is an exploded perspective view of the transmission mechanism;

FIG. 6 is an enlarged sectional view of part of the fluid control means of the mechanism;

FIG. 7 is a sectional view taken on the line 7—7 of FIG. 6;

FIG. 8 is a sectional view of the control means shown in FIG. 6, in a different position than in FIG. 6;

FIG. 9 is a perspective view of one of the valves employed in the control means shown in FIGS. 6 and 8;

FIG. 10 is a fragmentary sectional view of a modified form of the invention;

FIG. 11 is a sectional view taken on the line 11—11 of FIG. 10; and

FIG. 12 is a sectional view taken on the line 12—12 of FIG. 11.

Figure 1:
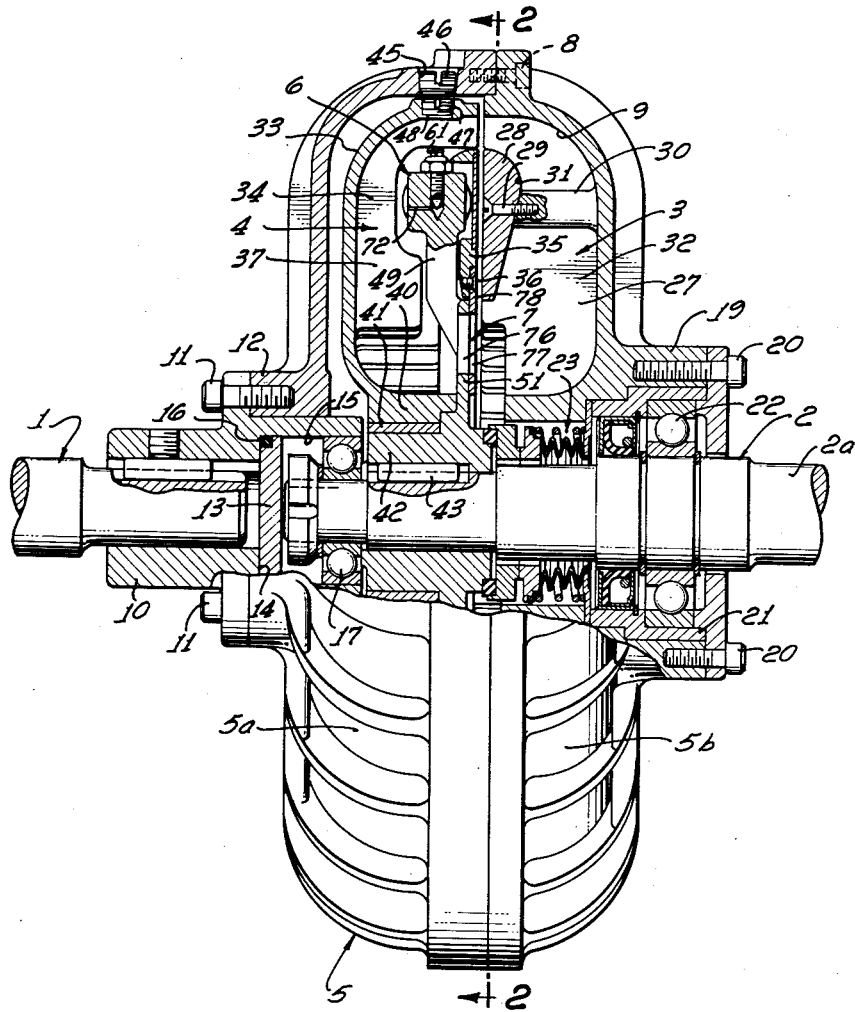
FIG. 1 is a sectional view partly in elevation of transmission mechanism embodying the present invention.

Fluid coupled transmission mechanism embodying the present invention is characterized by two bladed rotors and two shafts constructed and arranged so that the rotors cooperate to form a housing for the fluid employed as the driving couple between the rotors. One of the shafts has a positive driving connection with one of the rotors. The other rotor and the other shaft are permitted a controlled and limited relative movement by means of a novel driving connection therebetween. This relative movement is effected in accordance with the load imposed on the mechanism in any power application of the latter, and causes an equally novel control means to regulate the driving force of the fluid best to provide efficient starting and running characteristics for a wide variety of power transmission applications. Moreover, either shaft may be operated as the driving or as the driven shaft, as desired and this makes the transmission mechanism better suited to a wide variety of general power applications.

The construction of the mechanism of this invention readily lends itself to the production of transmission units in a wide range of small sizes to cover a wide range of power applications. The control means can be quickly adjusted to meet widely varying torque requirements, thereby assuring optimum characteristics in units of each size and reducing the number of models necessary to meet general transmission requirements.

In referring more specifically to FIGS. 1–9, one of the shafts and its associated rotor will be designated as the driving shaft and driving rotor or impeller respectively whereas the other impeller and the other shaft will be referred to as the driven rotor and the driven shaft respectively.

As shown in FIGS. 1–9 the transmission mechanism includes a driving shaft 1, a driven shaft 2, a driving rotor or impeller 3 and a driven rotor 4. The impeller 3 is a part of a housing 5 rotatably supported on the shafts 1 and 2. These shafts may be supported in any suitable manner, not shown, providing for the shaft 1 being driven by any suitable power source, but bearing in mind that if desired, the shaft 2 could be operated as the driving shaft.

Drive means generally designated 6 provides a drive connection between the rotor 4 and the shaft 2 permitting limited relative movement therebetween according to the load on the transmission mechanism.

A control means generally designated 7 operates responsive to relative movement between the shaft 2 and impeller 4 to control the driving force of the fluid as a couple between the rotors.

With reference to FIG. 1, it will be seen that the housing 5 comprises a pair of cup-like sections 5a and 5b rigidly joined at their outer margins by means of fastenings 8 to provide a chamber 9 to contain the fluid employed as the couple between the impeller 3 and the driven rotor 4. The sections 5a is drivingly coupled with the driving shaft 1, whereas the section 5b is freely rotatable on the shaft 2. The shaft 2 extends from the section 5b as at 2a for power take off purposes or to serve as the driving shaft.

The housing 5 which as here shown as a part of the impeller 3 is drivingly connected with the driving shaft 1 by means of flanged hub member 10 keyed on the shaft 1 and secured by fastenings 11 to a hub portion 12 of the housing section 5a. The hub member 10 is engaged with the hub portion 12 so as to form a fluid tight seal.

Fluid is prevented from leaking through the hub member 10 along the driving shaft 1 by means of a sealing disk 13 seated against a shoulder 14 formed by a counterbore 15 in the hub member 10. An O-ring 16 forms a seal between the disk 13 and the shoulder 14. The counter-bore 15 also accommodates a bearing 17 for one end of the driven shaft 2, which latter extends into the counter-bore.

The other section 5b of the housing 5 is provided with a hub portion 19 secured by fastenings 20 to a bearing supporting structure 21 mounted in the hub portion 19 and supporting a suitable bearing 22 for rotatably supporting the housing 5 on the driven shaft 2.

Suitable sealing means generally designated 23 surrounds the driven shaft 2 to prevent leakage of fluid along this shaft.

The driving rotor or impeller 3 includes a plurality of radial blades or vanes 27 integral with the section 5b of the housing 5. A guide ring 28 secured by fastenings 29 to posts 30 on the section 5b is mounted in recesses 31 formed in the vanes 27. This ring together with the vanes 27 and the section 5b form a series of arcuate flow channels 32 extending radially from the hub portion of the member 5 and having open ends at the inner and outer ends of the vanes. The channels 32 provide for circulation of the fluid to effect a fluid driving couple with the driven rotor 4 as will be hereinafter fully described.

The driven rotor 4 includes an annular cup-shaped body 33 having integral radial blades or vanes 34 and a guide ring 35 secured by fastenings 36 to certain of the vanes 34. The guide ring 35 cooperates with the vanes 34 and the cup-shaped body 33 to form flow channels 37 similar to the channels 31.

The body 33 of the driven rotor 4 has a hub portion 40 provided with a bushing 41 rotatably mounted on a hub 42 of the drive means 6 which latter will be hereinafter fully described. The hub 42 is keyed to the driven shaft 2 as at 43. This arrangement provides for rotation of the driven rotor 4 relative to the driven shaft 2 but this relative rotation is limited by the drive means 6 for the purpose hereinafter explained.

The fluid containing chamber 9 may be filled through an opening 45 in the section 5a of the housing 5, there being a screw plug 46 normally closing this opening. A similar opening 47 and plug 48 are provided in the body 33 of the driven rotor 4 to facilitate the filling of the space between the impeller 3 and the driven rotor 4. The openings 45 and 47 as will be apparent with reference to FIG. 2, also afford access to adjustable control means which will be hereinafter fully described.

It will now be apparent that the impeller 3 and housing 5 when rotated as a driving unit, will cause the fluid to circulate so as to drive the rotor 4 in the manner well known in this art, but with the driving action controlled through the medium of the drive means 6 and the control means 7 now to be described.

The driving means 6 permits of limited relative movement between the rotor 4 and the shaft 2 according to the torque requirements of the driven shaft. As here shown this relative movement is rotative and actuates the control means 7 to vary the driving force of the fluid with respect to the driven rotor 4 according to the load on the shaft 2.

The driving means 6 includes a pair of torque arms 49 and 50 extending radially from an annular member 51 integral or otherwise fixed to the hub 42 keyed on the shaft 2. The torque arms 49 and 50 are laterally offset as shown in FIG. 2, from the plane of the annular member 51 so as to be disposed between the ring 35 and the body member 33 of the driven rotor 4. In this connection it should be noted that the vanes 34 are recessed as at 38 to accommodate the enlarged outer ends 53 of the torque arms.

Means are provided for forming a flexible drive connection between the torque arms 49 and 50 and the rotor 4 so that limited relative angular movement of this rotor and torque arms may take place responsive to the load on the driven shaft. As here shown this means includes a pair of bellows 54 and 55 having like end fittings 56 at corresponding ends secured in any suitable manner to opposite sides of the enlarged outer end 53 of the torque arm 49. The other ends of these bellows are provided with fittings 52 fixedly connected with lugs 57 projecting from the ring 35 which latter as previously described is a part of the rotor 4. Bellows 59 and 60 identical with bellows 54 and 55 have their inner end fittings connected to opposite sides of the enlarged end 53 of the torque arm 50. The outer end fittings 52 of the bellows 59 and 60 are connected with lugs 57 on the ring 35. Coil springs 62 are mounted within the bellows 54, 55, 59 and 60 with their ends abutting the fittings of the bellows so as normally to hold the bellows extended as shown in FIG. 2.

The bellows 54 and 55 are communicative with one another by means of a passage 63 extending through the end 53 of the torque arm 49. An adjustable needle valve 61 is provided in the end 53 of the arm 50 for controlling the flow of fluid through the passage 63. The bellows 59 and 60 are similarly connected by a passage 65 in the end 53 of the torque arm 50 and this passage is also controlled by an adjustable needle valve 66. As shown in FIG. 2, the filling openings 45 and 47 may be used to gain access to the needle valves 61 and 66 whereby these valves may be adjusted as desired. Each of the bellows is provided with a port 69 at the end thereof connected with the ring 35. These ports are controlled by inwardly opening and normally open check valves 70 which permit the bellows to be filled with the fluid.

It will now be apparent that in starting the transmission mechanism with the shaft 1 operated as the driving shaft, the driven rotor 4 in being drivingly connected with the driven shaft 2 solely through the spring loaded bellows 54, 55, 59 and 60 and the torque arms 49 and 50 will move relative to the fittings 52 due to the load on the latter and the driven shaft, thereby tending to move the bellows in the direction of rotation of the driven rotor. Assuming that the driven rotor 4 is rotated in a counter-clockwise direction as seen in FIGS. 2 and 3 of the drawings, it will be apparent that the bellows 54 shown at the upper right side of FIG. 2 and the bellows 60 at the lower left side of FIG. 2 will be compressed against the action of the springs 62, due to the resistance offered by the torque arms 49 and 50 respectively, whereas the bellows 55 and 59 will be lengthened or extended. FIG. 3 shows how the bellows 60 will be compressed and the bellows 59 lengthened. These relative movements will cause fluid in the bellows to be transferred from the bellows 54 and 60 into the bellows 55 and 59 respectively, in other words, to be moved in the direction of rotation of the driven rotor 4. Thus the several bellows act as dash-pots wherein the rate of movement of the fluid therein is controlled by the setting of the needle valves 61 and 66 which may be manually adjusted and set best to suit the conditions at hand or the particular application of the transmission mechanism. The normally open check valves 70 at the outer ends of those of the bellows 54, 55, 59 and 60 which are extended during relative movement between the rotor 4 and shaft 2, will be closed by the pressure fluid being transferred from the bellows which are compressed. The check valves 70 in the latter are also closed by the pressure of the fluid. During this transfer of the fluid from one pair of bellows to the other pair, some of the fluid may be vented from the passages 63 and 65 into the main fluid chamber 9, through bleed ports 72 in the outer ends of the torque arms 49 and 50.

The control means 7 regulates the rate of interchange of fluid between the impeller 3 and rotor 4. The action of the control means 7 is effected and controlled by the relative movement between the shaft 2 and the rotor 4. Accordingly, the annular member 51 on the hub 42 keyed to the driven shaft 2, is provided with a series of ports 76 for movement into and out of registration with ports 77 formed in an annular plate 78. The plate 78 is secured by means of fastenings 79 to the ring 35 of the driven rotor 4. The annular member 51 and the annular plate 78 lie one against the other with the ports therein in full registration when the bellows 54, 55, 59 and 60 are extended by the springs 62 as shown in FIG. 2.

In the operation of the transmission mechanism, the spring loaded bellows 54, 55, 59 and 60 are extended whereby the flow control ports 76 and 77 are fully open as shown in FIGS. 2 and 7. When the driving force of the fluid becomes effective to impart rotative movement to the rotor 4, the spring loaded bellows connected with this rotor and the shaft 2, will yield and permit the rotor to turn without imparting a driving force to the shaft 2 due to the load on the latter. This relative turning movement of the rotor 4 causes the plate 78 joined thereto to turn so that the ports 77 therein are moved relative to the port 76 in the driven shaft carried member 51. This movement of the plate 78 either shuts off the flow of fluid between the impeller 3 and rotor 4 or reduces the driving effect of the fluid effective as a driving couple to the extent that the force is insufficient, during this initial starting phase to drive the shaft 2 at the full r.p.m. of shaft 1. The extent of this relative movement and the rate of such movement are factors which control the rate of interchange of fluid between the impeller 3 and rotor 4, such factors being dependent upon the load on the driven shaft and the setting of the needle valves 61 and 66. This control of the rate of flow fluid is desired so that the driving force of the fluid will be delayed sufficiently to enable the impeller 3 to reach a speed productive of the torque required by the driven shaft to smoothly pick up the load thereon and maintain efficient operation thereof according to such load.

When the driven rotor 4 begins to drive the shaft 2 through the compressed springs 62 in the bellows effecting the driving connection, these springs will expand as the load is picked up and thus cause such relative movement between the plate 78 and the member 51 as will progressively open the ports 76 and 77 thereby providing for an increased rate of flow of fluid operative as the fluid couple. In this manner the driving force of the fluid is at all times controlled in accordance with the torque requirements of the driven shaft. The needle valves 61 and 66 are adjusted and set to meet the requirements at hand depending upon the particular load or the loads to be carried by the driven shaft and the particular applications of the mechanisms.

A modified form of this invention as shown in FIGS. 10–12 differs from the form shown in FIGS. 1–9 only as to the location of the flexible drive connection between the driven rotor and the driven shaft. In the form shown in FIGS. 1–9 the torque arm and bellows are located between the impeller and the rotor whereas in this modified form the torque arms 82 and four bellows 83 are disposed outside of the space between the impeller and the rotor. This arrangement makes it possible to have ready access to adjustable needle valves 85 and adjustable stop means 86, there being an opening 87 for this purpose in a wall 88 of the impeller 5'. The opening 87 is closed by an inspection plate 89 removable held in place by fastenings 90.

The needle valves 85 (one of which is shown in FIG. 11) are operable to control the flow of fluid between the bellows 83 of each pair in the same manner as the needle valves 61 and 66 in the first described form of this invention. However, the needle valves 85 are positioned on the bellows so that they may be easily adjusted by a tool (not shown) inserted through the opening 87.

The adjustable stops 86 as here shown, are carried by the driven rotor 4' and disposed on opposite sides of each torque arm 82 as shown in FIG. 11, to limit relative movement between the torque arms and the driven rotor 4'. Adjustment of these stops provides for varying this relative movement as desired.

This modified form is advantageous in that the adjustable control elements including the stops 86 are readily accessible through the opening 87 for the adjustment thereof which may be required where widely varying starting load conditions are encountered.

Other than above noted, this modified from is of the same construction as shown in FIGS. 1–9 the parts corresponding to those shown in FIGS. 1–9 are identified by the same reference numerals to which the prime character is added.

I claim:

1. In a fluid coupled transmission mechanism having a fluid containing chamber in which a driving rotor, a driven rotor and means providing a fluid work circuit are operable to effect a fluid driving couple between said rotors, a shaft in said chamber; means providing a driving connection between one of said rotors and said shaft operable to permit limited relative movement between said one rotor and said shaft; said means including a torque arm fixed on said shaft; a pair of bellows each connected at its opposite ends with said arm and said one rotor respectively; means providing a passage communicating said bellows one with the other; said bellows having ports for intaking fluid from said chamber; check valves controlling said ports; spring means resisting compression of said bellows; and control means operatively connected with said shaft and said one of said rotors and operable to vary the driving force of said fluid responsive to said relative movement.

2. In a fluid coupled transmission mechanism having a fluid containing chamber in which are mounted a shaft, a pair of opposed rotors and means providing a fluid work circuit between said rotors; a torque member drivingly connected with said shaft; fluid containing bellows; means connecting said bellows at opposite ends with said member and one of said rotors respectively; springs engaged with said bellows to form therewith a flexible drive connection permitting relative rotative movement between said shaft and said one rotor; said bellows having ports affording communication between the interior of said bellows and said chamber; check valves controlling said ports; means providing a passage between said bellows; valve means in said passage adjustable to vary the flow of fluid through said passage; and means in said chamber operable responsive to relative movement between said shaft and said one rotor to control the rate of interchange of fluid between said rotors.

3. In a fluid coupled transmission mechanism having a fluid containing chamber in which are mounted a shaft, a pair of opposed rotors and means providing a fluid work circuit between said rotors; a pair of torque arms drivingly connected with said shaft; a pair of fluid containing bellows connected at opposite ends to each torque arm and to one of said rotors; springs engaged with said bellows to form therewith a drive connection permitting relative rotative movement between said shaft and said one rotor; said bellows having ports which communicate the interior of the bellows with said chamber; check valves controlling said ports; means providing a passage between the bellows of each pair; valve means adjustable to control flow of fluid through said passage and flow control members connected with said torque arms and said one rotor, respectively, for relative movement to vary the rate of interchange of fluid between said rotors in response to said relative rotative movement of said shaft and said one rotor.

4. In a fluid coupled transmission mechanism having a fluid containing chamber in which are mounted a shaft, a pair of opposed rotors and means providing a fluid work circuit between said rotors; a pair of torque arms drivingly connected with said shaft; a pair of fluid containing bellows connected at opposite ends to each torque arm and to one of said rotors; springs engaged with said bellows to form therewith a drive connection permitting relative rotative movement between said shaft and said one rotor; said bellows having ports which communicate the interior of the bellows with said chamber; check valves controlling said ports; means providing a passage between the bellows of each pair; valve means adjustable to control flow of fluid through said passage; and opposed members operatively connected with said shaft and said one rotor, respectively, and operable to regulate fluid effective as a couple between said rotors.

5. In a fluid coupled transmission mechanism having a fluid containing chamber in which are mounted a shaft, a pair of opposed rotors and means providing a fluid work circuit between said rotors; a pair of torque arms drivingly connected with said shaft; a pair of fluid containing bellows connected at opposite ends to each torque arm and to one of said rotors; springs engaged with said bellows to form therewith a drive connection permitting relative rotative movement between said shaft and said one rotor; said bellows having ports which communicate the interior of the bellows with said chamber; check valves controlling said ports; means providing a passage between the bellows of each pair; valve means adjustable to control flow of fluid through said passage; and opposed relatively rotatable members between said rotors operable responsive to relative rotative movement between said shaft and said one rotor to vary the rate of vortical flow of fluid circulated between said rotors.

6. In a fluid coupled transmission mechanism having a fluid containing chamber in which are mounted a shaft, a pair of opposed rotors and means providing a work circuit between said rotors; a pair of torque arms drivingly connected with said shaft; a pair of fluid containing bellows connected at opposite ends to each torque arm and to one of said rotors; springs engaged with said bellows to form therewith a drive connection permitting relative rotative movement between said shaft and said one rotor; said bellows having ports which communicate the interior of the bellows with said chamber; check valves controlling said ports; means providing a passage between the bellows of each pair; valve means adjustable to control flow of fluid through said passage; and disk means being connected to turn with said shaft and said one rotor respectively, said disk means being in the path of fluid circulating between said rotors, said disk means having ports therein to control the rate of vortical flow of fluid circulated between said rotors according to said relative movement of said one rotor and said shaft.

7. In fluid coupled transmission mechanism having a fluid containing chamber in which a driving rotor, a driven rotor and means providing a fluid work circuit are operable to effect a fluid driving couple between said rotors; a shaft in said chamber; means providing a drive connection between said shaft and one of said rotors operable to permit limited relative rotative movement in either direction between said shaft and said one rotor; said drive connection means including dashpot means disposed in said chamber and operatively connected to said shaft and to said one rotor, respectively, for yieldably resisting said relative rotative movement of said shaft and said one rotor; and means in said chamber operatively connected with said shaft and said one rotor, respectively, for varying the rate of interchange of fluid from one rotor to the other according to the relative rotative movement of said shaft and said one rotor.

8. In fluid coupled transmission mechanism having a fluid containing chamber in which a driving rotor, a driven rotor and means providing a fluid work circuit are operable to effect a fluid driving couple between said rotors; a shaft in said chamber; means providing a drive connection between said shaft and one of said rotors operable to permit limited relative rotative movement in either direction of said shaft and said one rotor; said drive connection means including dashpot means mounted in said chamber and operatively connected to said shaft and to said one rotor, respectively, for yieldably resisting said relative rotative movement of said shaft and said one rotor; spring means operatively associated with said dashpot means for resisting said relative rotative movement; and means in said chamber operatively connected with said shaft and said one rotor, respectively, for varying the rate of interchange of fluid from one rotor to the other according to the relative rotative movement of said shaft and said one rotor.

9. Fluid coupled transmission mechanism including: a housing providing a fluid containing chamber; a driving rotor in said housing; a driven rotor opposed to said driving rotor; a rotary shaft; means providing in said housing a fluid work circuit for said rotors; means providing a drive connection between said shaft and one of said rotors operable to permit limited relative rotative movement in either direction of said shaft and said one rotor according to the load on said shaft; said drive connection including dashpot means mounted in said housing and operatively connected to said shaft and to said one rotor, respectively, for yieldably resisting said relative rotative movement of said shaft and said one rotor; said dashpot means having ports communicating the interior thereof with said chamber; check valves controlling said ports; and means in said housing operatively connected with said shaft and said one rotor, respectively, for varying the rate of interchange of fluid from one rotor to the other according to the relative rotative movement of said shaft and said one rotor.

10. In fluid coupled transmission mechanism having a fluid containing chamber in which a driving rotor, a driven rotor and means providing a fluid work circuit are operable to effect a fluid driving couple between said rotors; a shaft in said chamber; means providing a drive connection between said shaft and one of said rotors operable to permit limited relative rotative movement in either direction of said shaft and said one rotor; said drive connection means including dashpot means mounted in said chamber and operatively connected to said shaft and to said one rotor, respectively, for yieldably resisting said relative rotative movement of said shaft and said one rotor; said dashpot means having ports communicating the interior thereof with said chamber; normally open check valves at said ports operable responsive to fluid pressure within said dashpot means to close said ports; and means operatively connected with said shaft and said one rotor, respectively, for varying the rate of interchange of fluid from one rotor to the other according to the relative rotative movement of said shaft and said one rotor.

11. Transmission mechanism including: a housing providing a fluid containing chamber; a driving rotor in said housing; a driven rotor opposed to said driving rotor; a rotary shaft; means providing in said housing a fluid work circuit for said rotors; a drive connection between said shaft and one of said rotors operable to permit limited relative rotative movement in either direction of said shaft and said one rotor according to the load on said shaft; said drive connection including dashpot means mounted in said housing and operatively connected to said shaft and to said one rotor, respectively, for yieldably resisting said relative rotative movement of said shaft and said one rotor; said dashpot means having ports communicating the interior thereof with said chamber; normally open check valves at said ports operable responsive to fluid pressure within said dashpot means to close said ports; means in said housing operatively connected with said shaft and said one rotor, repsectively, for varying the rate of interchange of fluid from one rotor to the other according to the relative rotative movement of said shaft and said one rotor; said dash pot means including a pair of expansible chambers having a passage therebetween for the flow of fluid from one chamber to other; spring means associated with said dashpot means to resist said relative rotative movement; and valve means in said passage operable to control the flow of fluid between said expansible chambers.

12. Transmission mechanism including: a housing providing a fluid containing chamber; a driving rotor in said housing; a driven rotor opposed to said driving rotor; a rotary shaft; means providing in said housing a fluid work circuit for said rotors; a drive connection between said shaft and one of said rotors operable to permit limited relative rotative movement in either direction of said shaft and said one rotor according to the load on said shaft; said drive connection including dashpot means mounted in said housing and operatively connected to said shaft and to said one rotor, respectively, for yieldably resisting said relative rotative movement of said shaft and said one rotor; means in said housing operatively connected with said shaft and said one rotor, respectively, for varying the rate of interchange of fluid from one rotor to the other according to the relative rotative movement of said shaft and said one rotor; said housing having an access opening in a wall thereof; said dashpot means being located between said wall and said one rotor; control means for said dashpot means disposed in position to be actuated through said opening; and a closure for said opening.

13. Transmission mechanism including: a housing providing a fluid containing chamber; a driving rotor in said housing; a driven rotor opposed to said driving rotor; a rotary shaft; means providing in said housing a fluid work circuit for said rotors; a drive connection between said shaft and one of said rotors operable to permit limited relative rotative movement in either direction of said shaft and said one rotor according to the load on said shaft; said drive connection including dashpot means mounted in said housing and operatively connected to said shaft and to said one rotor, respectively, for yieldably resisting said relative rotative movement of said shaft and said one rotor; and means in said housing operatively connected with said shaft and said one rotor, respectively, for varying the rate of interchange of fluid from one rotor to the other according to the relative rotative movement of said shaft and said one rotor; said means for varying the rate of said interchange of fluid being disposed between said rotors; said dashpot means being also disposed between said rotors.

14. In fluid coupled transmission mechanism having a fluid containing chamber in which are mounted an impeller, a rotor, means providing a fluid work circuit between said impeller and said rotor, a driven shaft, means providing a flexible drive connection permitting limited relative rotation between said shaft and said rotor according to the load on said shaft, and fluid flow control means operatively connected with said shaft and said rotor, respectively, and operable to vary the rate of interchange of fluid between said impeller and said rotor; that improvement wherein said flexible drive connection includes dashpot means mounted in said chamber and operatively connected with said shaft and said rotor to control the rate of said relative rotation to operate said fluid flow control means to delay the increase of the rate of interchange of fluid forming said driving couple upon rotative movement of said rotor relative to said shaft in one direction and to delay the decrease of the rate of interchange of fluid in said couple upon rotative movement of said rotor relative to said shaft in the opposite direction.

15. In a fluid coupled transmission mechanism having a fluid containing chamber in which a driving rotor, a driven rotor and means providing a fluid work circuit are operable to effect a fluid driving couple between said rotors; a shaft in said chamber; means providing a driving connection between one of said rotors and said shaft operable to permit limited relative rotative movement between said one rotor and said shaft; said means including a torque arm fixed on said shaft; a pair of bellows each connected at its opposite ends with said arm and said one rotor, respectively; means providing a passage communicating said bellows one with the other; said bellows having ports for intaking fluid from said chamber; check valves controlling said ports; spring means resisting compression of said bellows; control means operatively connected with said shaft and said one of said rotors and operable to vary the driving force of said fluid responsive to said relative movement; and stop means in said chamber engageable by said torque arm to limit movement thereof in either direction; said stop means being adjustable to vary the extent of movement of said torque arm.

References Cited in the file of this patent
UNITED STATES PATENTS

| | | |
|---|---|---|
| 1,855,032 | Sinclair | Apr. 19, 1932 |
| 1,959,889 | Wunsch | May 22, 1934 |
| 2,073,357 | Wemp | Mar. 9, 1937 |
| 2,096,070 | Sinclair | Oct. 19, 1937 |
| 2,245,684 | Kiep | June 17, 1941 |
| 2,283,842 | Yingling | May 19, 1942 |
| 2,358,473 | Patterson | Sept. 19, 1944 |
| 2,390,133 | Snyder | Dec. 4, 1945 |
| 2,420,071 | Fields | May 6, 1947 |
| 2,424,384 | Comstock | July 22, 1947 |
| 2,758,442 | Fast | Aug. 14, 1956 |

FOREIGN PATENTS

| | | |
|---|---|---|
| 956,045 | France | Jan. 23, 1950 |
| 541,961 | Germany | Jan. 16, 1932 |

UNITED STATES PATENT OFFICE
CERTIFICATE OF CORRECTION

Patent No. 3,003,318                        October 10, 1961

Don Heyer

It is hereby certified that error appears in the above numbered patent requiring correction and that the said Letters Patent should read as corrected below.

Column 1, line 53, after "transmission" insert -- mechanism --; column 5, line 51, strike out "rate of flow --.

Signed and sealed this 24th day of April 1962.

(SEAL)
Attest:

ESTON G. JOHNSON
Attesting Officer

DAVID L. LADD
Commissioner of Patents